United States Patent [19]

Batt

[11] 4,226,549
[45] Oct. 7, 1980

[54] LOCKING HINGE JOINT
[75] Inventor: Richard L. Batt, Gardner, Mass.
[73] Assignee: Collier-Keyworth Company, Gardner, Mass.
[21] Appl. No.: 25,328
[22] Filed: Mar. 30, 1979
[51] Int. Cl.² .................................................. F16C 11/10
[52] U.S. Cl. ..................... 403/92; 403/327; 16/144
[58] Field of Search ............... 403/102, 100, 93, 92, 403/96, 324, 327, 95; 16/144, 139, 143, 163, 147

[56] References Cited
U.S. PATENT DOCUMENTS

| | | | |
|---|---|---|---|
| 575,266 | 1/1897 | McCollum et al. | 403/92 X |
| 635,744 | 10/1899 | Catudal | 403/96 X |
| 1,520,134 | 12/1924 | Mizer | 403/102 |
| 1,618,885 | 2/1927 | Minor | 16/144 UX |

FOREIGN PATENT DOCUMENTS 122669  5/1931  Austria .................................. 403/100

Primary Examiner—Andrew V. Kundrat

[57] ABSTRACT

A locking hinge joint includes a pair of spaced pivot supports such as a bracket of U-cross-section, a hinge member mounted for swinging movement between the supports, and a reciprocable lock mounted on the supports slidable parallel to the swing axis to and from a position in which it positively locks the hinge member against swinging. Two hinge members mounted on a single bracket can be locked simultaneously.

8 Claims, 9 Drawing Figures

LOCKING HINGE JOINT

This invention relates to a locking hinge joint and pertains more specifically to a joint having a pair of hinge members pivotally mounted in a U-shaped bracket together with a locking element for locking both hinge members simultaneously in a desired position.

One feature of the invention is the provision of a simple and inexpensive positively acting lock for a hinge joint.

Another feature is the provision of a locking hinge joint in the form of a pair of spaced apart pivot supports, a hinge member having one end pivotally mounted between the supports for swinging movement between them, and a locking element mounted on the supports for movement generally parallel to the swing axis of the hinge member to and from a first position in which the locking element positively interferes with swinging movement of the hinge member and a second position in which the swinging movement is free from interference.

Still another feature is the provision of a locking hinge joint in the form of a bracket of U-shaped cross-section and a pair of hinge members or arms extending from opposite ends thereof and having a single locking element movable transversely of the bracket and arranged to lock both arms simultaneously in their extended position.

Other and further features and advantages will be apparent from the drawing and from the description which follows. The locking hinge joints of the present invention are particularly adapted for use as collapsible or folding support struts such as appear for example in strollers, baby carriages, toys and furniture such as tables, chairs, playpens, or the like.

Figure 1:
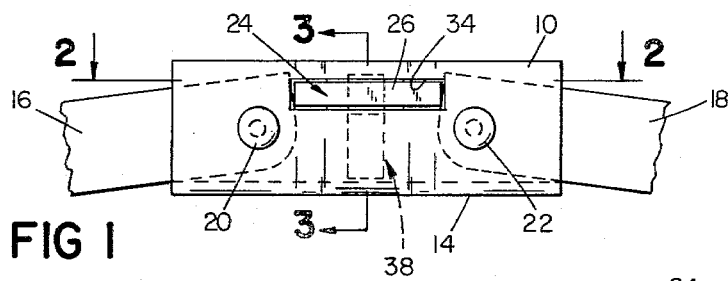
FIG. 1 is a view in side elevation showing one embodiment of the present invention.

As shown in the drawings, the locking hinge joint includes a pair of spaced-apart pivot supports in the form of a pair of parallel plates 10,12 joined together at 14 along their bottom margins to form a bracket of U-shaped cross-section. A pair of spaced apart hinge members 16,18 in the form of bars or arms are pivotally mounted on pins 20,22 for swinging movement between supports 10,12. Pivots 20,22 are spaced apart from each other, pivot 20 being adjacent the left-hand end of the bracket as shown in FIG. 1 and pivot 22 being adjacent the right-hand end.

Figure 3:
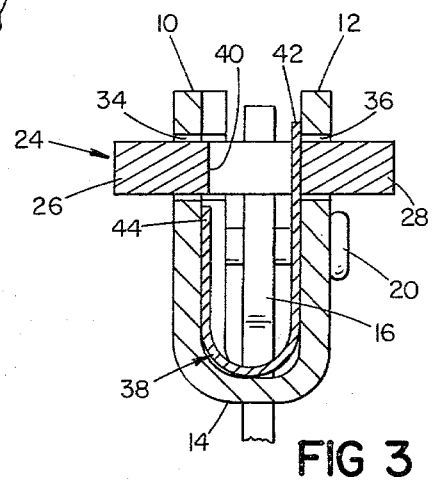
FIG. 3 is a view taken along line 3—3 of FIG. 1.
Figure 2:
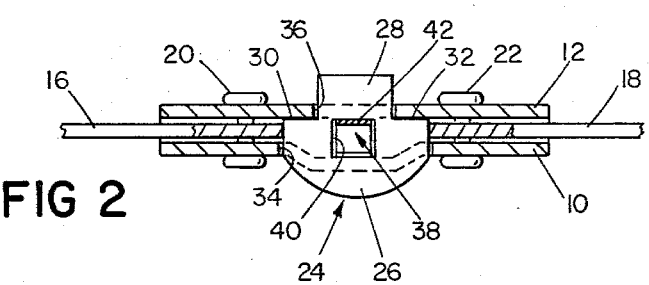
FIG. 2 is a view taken along line 2—2 of FIG. 1 showing the locking element in its locking position.
Figure 4:
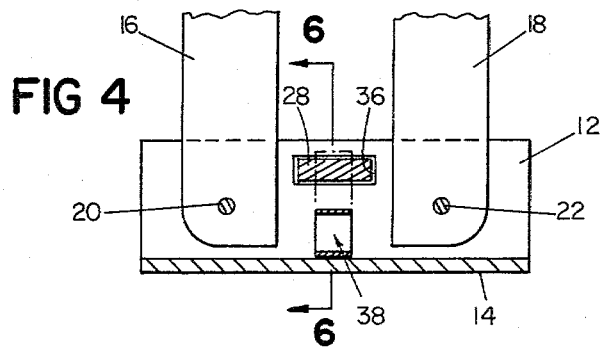
FIG. 4 is a view corresponding to FIG. 1 partly broken away and in section.
Figure 5:
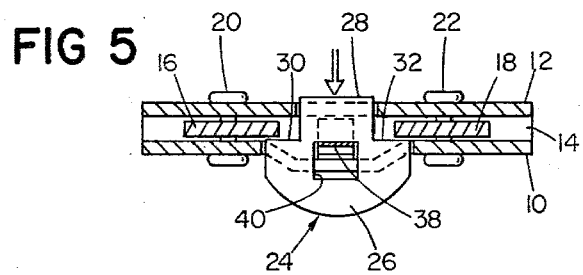
FIG. 5 is a view corresponding to FIG. 2 showing the locking element in its release position.
Figure 6:
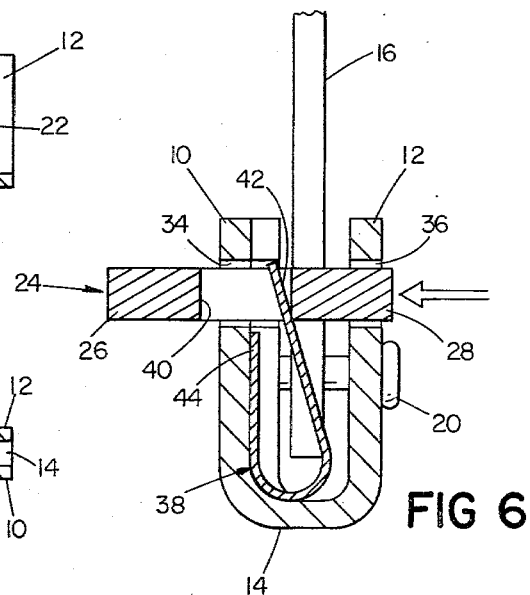
FIG. 6 is a view corresponding to FIG. 3 showing the locking element in its release position.
Figure 7:
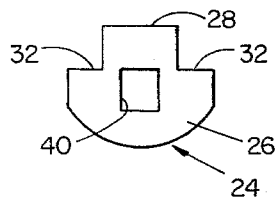
FIG. 7 is a plan view of the locking element.
Figure 8:
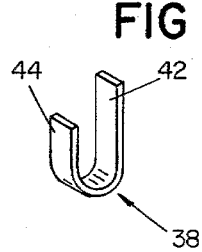
FIG. 8 is an isometric view showing a leaf spring.

Locking element 24 is in the form of a generally T-shaped member having a wide main body 26 and a narrow extension 28 joined to the main body at one end thereof by a pair of shoulders 30,32. A pair of opposing slots 34,36 are provided in plates 10 and 12 between the swing axes of pivots 20 and 22, slot 34 being wide enough to accommodate the main body 26 of locking element 24 and slot 36 being narrower, of a size to accommodate extension 28. Locking element 24 is mounted for sliding movement in slots 34,36 generally parallel to the swing axes of the hinge members to and from a first or locking position as shown in FIGS. 1–3 in which the main body 26 extends across the space between plates 10 and 12 so that its lateral margins interfere with swinging movement of hinge members 16,18 by positively engaging the ends of those members; at the same time each hinge member is blocked against swinging in the opposite direction by closed margin 14 of plates 10,12. In the second or release position as shown in FIGS. 5 and 6 extension 28 extends across the space between plates 10 and 12 to provide clearance for the hinge members to swing. In the release position of the locking element, the hinge members are free to swing to and from their first position as shown in FIG. 1 in which they extend outwardly through the open ends of the bracket to a second position as shown in FIG. 4 in which they extend through the open side thereof. In the first or locking position of locking element 24, the shoulders 30,32 abut the inner wall of plate 12 as shown in FIG. 2, while in the second or release position, the shoulders abut the lateral surfaces of hinge members 16,18 as shown in FIG. 5.

Figure 9:
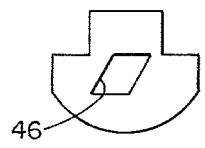
FIG. 9 is a plan view showing a second embodiment of the locking element.

In order to maintain the locking element in its first or locking position, a spring is provided in the form of a J-shaped leaf spring 38 mounted within the bracket with its closed end adjacent the closed margin 14 of plates 10,12. A rectangular aperture 40 is centrally located in locking element 24 to permit insertion of the spring into position with its longer leg 42 extending upwardly into aperture 40 and yieldably urging the locking element to its first or locking position. By making aperture 40 slightly narrower than the space between pivot supports 10,12 as well as narrower than the gap between the open ends of spring 38, the shorter leg 44 of the spring is engaged beneath locking element 24 adjacent a margin of opening 40 when the spring is in expanded position as shown in FIG. 3, thus retaining the spring in its operating position. When the locking element is in the second or release position, the tension in spring 38 is normally sufficient to retain it in position as shown in FIG. 6. However, in order to make sure that the spring cannot be accidentally dislodged, there may be employed the embodiment shown in FIG. 9 in which locking element 24 is provided with an aperture 46 in the shape of a rhomboid. This makes it possible to insert the spring through the aperture, since the spring is free to twist as well as bend; however, once the shorter leg 44 passes through the aperture 46, it snaps into the position shown in FIG. 6 and is engaged beneath a margin of the rhomboid-shaped opening regardless of the position of the locking element thereafter.

In operation, the locking element may be disengaged from its locked position as shown in FIG. 2 by pressing against extension 28 which projects through slot 36, enabling the two hinge members to be folded or swung to the position shown in FIG. 4. It should be noted that in the embodiment illustrated, the two hinge members or arms 16,18, when their lateral margins bear against closed margin 14 of the bracket in the position shown in FIG. 1 have passed through dead center (i.e., the line extending through the centers of pivots 20,22) so that they normally tend to retain that position, particularly if the joint forms a part of a thrust-bearing strut, even without the locking element 24. However, the hinge members can be folded and the joint collapsed by lateral pressure on the supports or bracket (in a downward direction as shown in FIG. 1), and locking element 24 prevents accidental collapse if such lateral pressure is inadvertently applied. In order to lock the joint, the two hinge members are simply swung from the positions shown in FIG. 4 to those shown in FIG. 1 in which they project from the ends of the bracket. As soon as the margins of the hinge members clear the shoulders 30,32 of the locking element, it is urged to locking position by the spring, thus positively interfering with pivotal movement of the hinge members in the reverse direction while at the same time the closed margin of the U-shaped bracket interferes with and blocks further pivotal movement of hinge members in the same direction.

Although the locking hinge joint is shown in the drawings with the closed margin 14 of the bracket at the bottom, it will be appreciated that it equally well can be used in reversed position with margin 14 at the top.

What is claimed is:

1. A locking hinge joint comprising a bracket of U-shaped cross-section having open ends and an open side,
   a first hinge member pivotally mounted within said bracket adjacent one end thereof,
   a second hinge member pivotally mounted within said bracket adjacent the opposing end thereof,
   each hinge member being mounted to pivot to and from a first position in which it extends outwardly through an end of said bracket and a second position in which it extends outwardly through the open side thereof,
   a locking element slidably mounted in opposing slots in said bracket between the pivot mountings of said hinge members for movement transversely of said bracket to and from a first position in which it blocks pivotal movement of both said hinge members from their first position and a second position in which said hinge members are free to pivot,
   said locking element including a main body and a narrow extension joined to the main body at an end thereof by a pair of shoulders, said extension being received in one said slot and said main body being received in the other said slot,
   said main body extending across said bracket and said extension projecting through its slot externally of the bracket with said shoulders abutting the inner wall of said bracket when said locking element is in its first position, and said narrow extension extending across said bracket when said locking element is in its second position, and
   a spring for yieldably urging said locking element towards its first position.

2. A locking hinge joint as claimed in claim 1 in which said spring is a leaf spring in J-configuration, said main body has an aperture therein, and said spring is seated within the closed margin of said bracket with its longer leg extending into said aperture and bearing against a margin thereof.

3. A locking hinge joint as claimed in claim 2 in which said aperture is in the form of a rhomboid through which said spring is insertable by twisting and the shorter leg of said spring terminates short of said aperture when said spring is in seated position and is engaged beneath said locking element adjacent a margin of said aperture.

4. A locking hinge joint comprising a bracket of U-shaped cross-section having a closed margin and open ends and an open side,
   a first arm pivotally mounted within said bracket adjacent one end thereof,
   a second arm pivotally mounted within said bracket adjacent the opposing end thereof,
   said arms having lateral margins,
   each arm being mounted to pivot to and from a first over center position in which it extends outwardly through an end of said bracket with its lateral margin bearing against the closed margin of said bracket in said over center position, and a second position in which it extends outwardly through the open side thereof, said arms and bracket being constructed and arranged so that the arms pass through dead center in moving to and from said first and second positions,
   a locking element mounted on said bracket between the pivot mountings of said arms for movement transversely of said bracket to and from a first position in which it blocks pivotal movement of both said arms from their first position and a second position in which said arms are free to pivot.

5. A locking hinge joint as claimed in claim 4 including a spring for yieldably urging said locking element towards said first position.

6. A locking hinge joint as claimed in claim 5 in which said element is slidably mounted in opposing slots in said bracket and includes a main body and a narrow extension joined to the main body at an end thereof by a pair of shoulders, said extension being received in one said slot, and said main body being received in the other said slot,
   said main body extending across said bracket and said extension projecting through its slot externally of the bracket with said shoulders abutting the inner wall of said bracket when said locking element is in its first position, and said narrow extension extending across said bracket when said locking element is in its second position.

7. A locking hinge joint as claimed in claim 6 in which said spring is a leaf spring in J-configuration, said main body has an aperture therein, and said spring is seated within the closed margin of said bracket with its longer leg extending into said aperture and bearing against a margin thereof.

8. A locking hinge element as claimed in claim 7 in which said aperture is in the form of a rhomboid through which said spring is insertable by twisting and the shorter leg of said spring terminates short of said aperture when said spring is in seated position and is engaged beneath said locking element adjacent a margin of said aperture.

* * * * *